(12) United States Patent
Kulkarni et al.

(10) Patent No.: US 11,536,970 B1
(45) Date of Patent: Dec. 27, 2022

(54) TRACKING OF ITEM OF INTEREST USING WEARABLE HEADS UP DISPLAY

(71) Applicant: GOOGLE LLC, Mountain View, CA (US)

(72) Inventors: Sushant Kulkarni, Kitchener (CA); Idris S. Aleem, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/224,690

(22) Filed: Apr. 7, 2021

Related U.S. Application Data (60) Provisional application No. 63/006,260, filed on Apr. 7, 2020.

(51) Int. Cl.
| | | |
|---|---|---|
| G02B 27/01 | (2006.01) | |
| G06F 3/16 | (2006.01) | |
| G06V 20/20 | (2022.01) | |
| G06V 20/00 | (2022.01) | |

(52) U.S. Cl.
CPC ......... *G02B 27/0172* (2013.01); *G06F 3/167* (2013.01); *G06V 20/20* (2022.01); *G06V 20/36* (2022.01); *G02B 2027/014* (2013.01); *G02B 2027/0138* (2013.01); *G02B 2027/0178* (2013.01)

(58) Field of Classification Search
CPC .............. G06F 3/167; G02B 27/0172; G02B 2027/014; G02B 2027/0138; G02B 2027/0178; G06V 20/36; G06V 20/20
See application file for complete search history.

(56) References Cited

U.S. PATENT DOCUMENTS

| | | | |
|---|---|---|---|
| 2015/0326570 A1* | 11/2015 | Publicover | H04N 5/23229 382/117 |
| 2016/0239080 A1* | 8/2016 | Margolina | G06F 3/017 |
| 2018/0033306 A1* | 2/2018 | Kim | G08G 1/166 |

\* cited by examiner

*Primary Examiner* — Muhammad N Edun (57) ABSTRACT

A wearable heads-up display (WHUD) obtains attribute data corresponding to an attribute of an item of interest and obtains environmental data of an environment surrounding the WHUD via one or more sensors of the WHUD. The WHUD compares the attribute data with the environmental data to detect the item of interest. In response to the detection, the WHUD obtains location data indicative of a location of the item of interest, stores the location data in association with a context of detection of the item of interest. In response to a trigger, such as a query by a user regarding the item of interest, the WHUD provides a location indication based on the location data, the location indication including, for example, a display of a description of the location of the item of interest, a display of the item of interest at the location, and the like.

20 Claims, 4 Drawing Sheets

TRACKING OF ITEM OF INTEREST USING WEARABLE HEADS UP DISPLAY

CROSS-REFERENCE TO RELATED APPLICATIONS

The present application claims priority to U.S. Provisional Patent Application Ser. No. 63/006,260, entitled "WEARABLE HEADS-UP DISPLAYS AND METHODS OF OPERATING THEREOF" and filed on Apr. 7, 2020, the entirety of which is incorporated by reference herein.

BACKGROUND

A wearable electronic device may comprise a portable electronic device that is worn by a user close to or on the surface of the skin. Examples of wearable electronic devices include wearable heads-up displays (WHUDs), smart wristwatches, electronic bands, electronic rings, hearing aids, and like.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the shapes of the elements as drawn are not necessarily intended to convey any information regarding the actual shape of the particular elements and have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is as "including, but not limited to." As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise. The headings and Abstract of the Disclosure provided herein are for convenience only and do not interpret the scope or meaning of the implementations. Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, secured to, and/or supported by, with or without any number of intermediary physical objects therebetween.

Some systems (e.g., a WHUD) disclosed herein use sensor inputs such as inputs from a camera, an inertial measurement unit (IMU), a microphone, a radar sensor, a lidar sensor, and the like, to detect an item of interest in an environment surrounding the systems. Further, the systems also use computer vision and machine learning techniques to aid the sensor inputs to detect the item of interest. After detection of the item of interest, the systems provide location information about the detected item in response to a trigger such as a user query. Furthermore, the systems disclosed herein may use feature detection and mapping to construct a repository (e.g., knowledge graph) of items of interest in the environment. The knowledge graph may be updated from time to time to allow the knowledge graph to have updated information (e.g., location information) about the items of interest. For example, when a query is received from the user for the item of interest, the system may search in the knowledge graph for the last sighting of the queried item. In response to the user query, the systems may, for example, display the location information for the item of interest or guide the user to a last known location of the item of interest by using metadata such as location data stored along with the last sighting of the item of interest.

Figure 1:
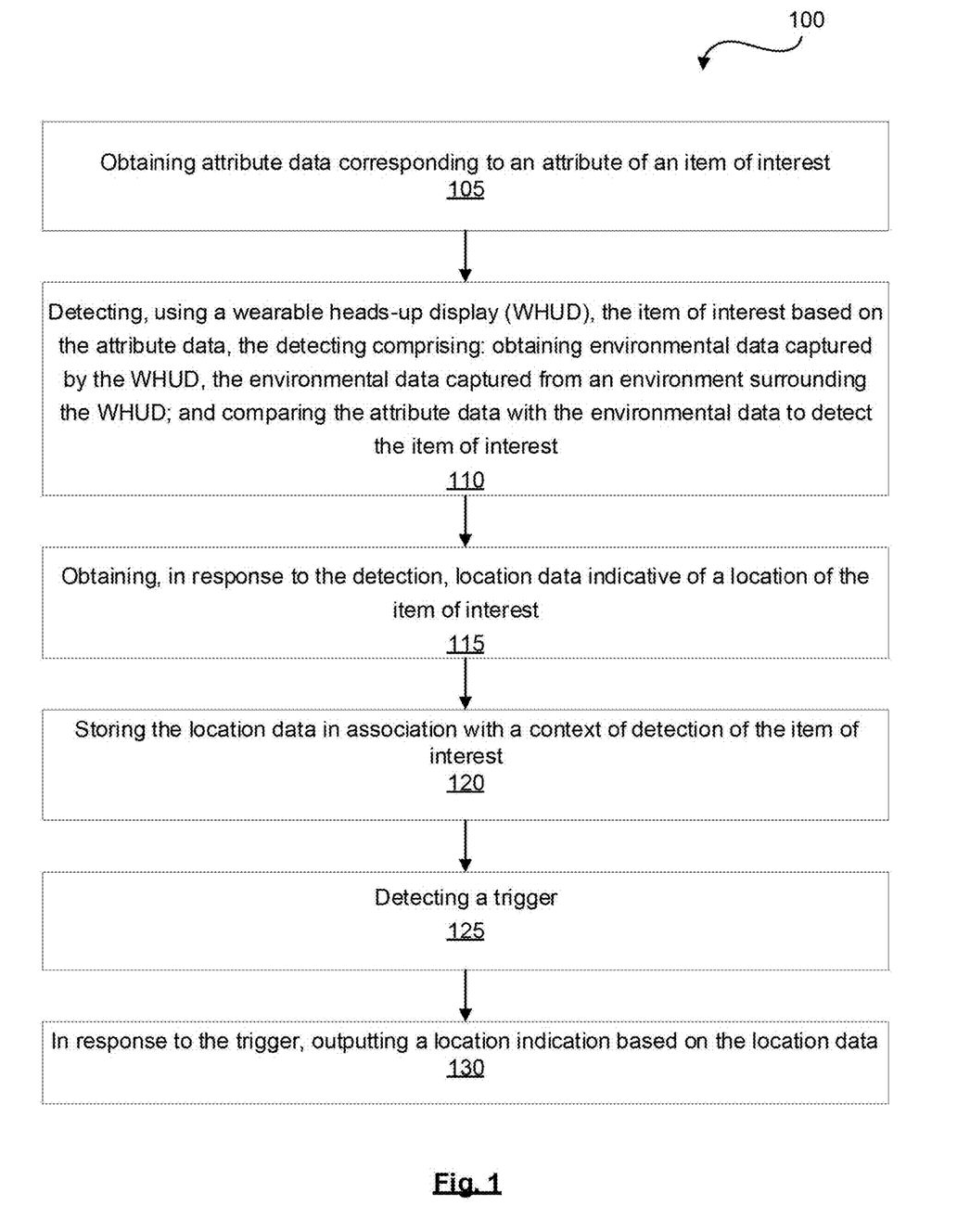
FIG. 1 shows a flowchart of an example method of determining a location and outputting a location indication of an item of interest using a WHUD or similar system in accordance with some embodiments of the present disclosure.

FIG. 1 illustrates a flowchart of an example method 100 of determining a location of an item of interest and outputting a location indication in response, in accordance with some embodiments. The method 100 may be performed by using an example system 200 or by an example WHUD 300, which are described in greater detail in relation to FIGS. 2 and 3, respectively. In some examples, a controller 230 (FIG. 2) may perform or control the performance of operations described in relation to method 100. In some examples, the example system 200 may be implemented as a part of or incorporated into the example WHUD 300.

Turning now to method 100, at block 105, attribute data corresponding to an attribute of an item of interest is obtained. In some examples, the item of interest may include any item that may be associated with a user. In some examples, the user may be a wearer of a WHUD such as WHUD 300 of FIG. 3. In some examples, the item of interest may include a personal item belonging to the user. In some examples, the item of interest may not be associated with the user. In some examples, the attribute of the item of interest may be determined, and then the attribute data corresponding to the attribute may be obtained. In some examples, the item of interest may be registered with the system. For the registered item of interest, the attributes (e.g., features) of the item of interest may be determined, and then an attribute, from the registered attributes may be selected. The selected attribute may be an attribute that is helpful to distinguish the item of interest from other items in an environment, for example, in an unknown environment, around the user. The attributes of the item of interest may be determined by obtaining data, such as but not limited to, audio data, video image, image data, IMU data, and the like. In some examples, the attributes of the item of interest may be determined by obtaining data from, for example, the WHUD 300 or other near-eye display system.

Figure 3:
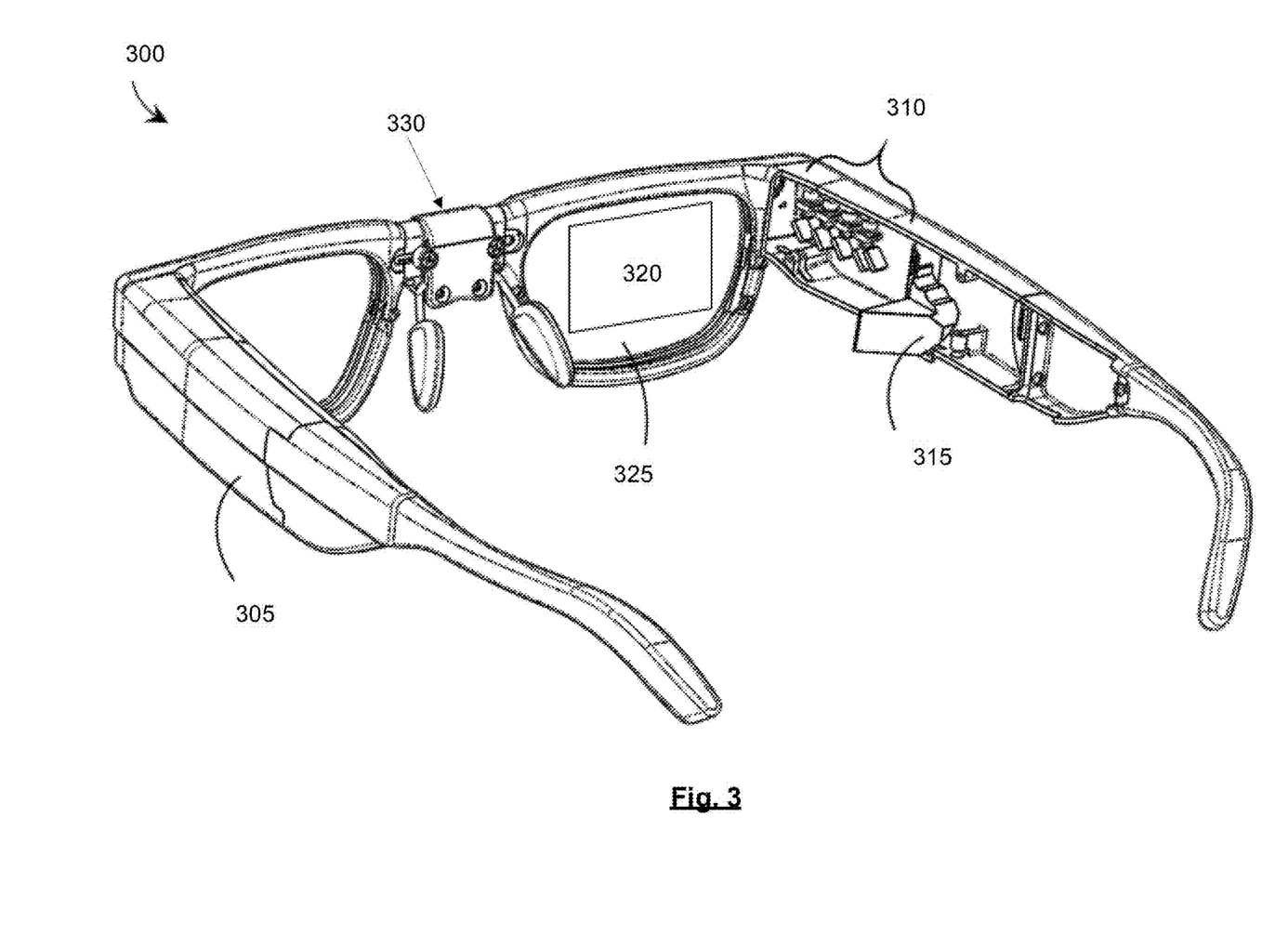
FIG. 3 shows a partial-cutaway perspective view of an example WHUD in accordance with some embodiments of the present disclosure.

In some examples, categories for the item registration may be pre-built, and attribute(s) of the registered item of interest may be extracted in advance, for example, by training a machine learning model. In other words, the attributes associated with the pre-built category associated with the item of interest may be determined as the attribute of the item of interest. In some examples, the attribute of the item of interest may be determined one or a combination of computer vision techniques. For example, machine learning may be employed to determine the attribute of the item of interest. In an example, a machine learning model may be trained with the attribute of the item of interest over a period of time, and the attribute of the item of interest may be stored in association with the item of interest. For example, hand-engineered or machine learned attributes (e.g., features) could be extracted from images of the item of interest. The extracted attributes from the images of the item of interest may include attributes that are invariant or equivariant to scale, rotation, skewing, and perspective deformation. For example, feature detectors based on computer vision such as, but not limited to, Oriented FAST and Rotated BRIEF (ORB) may also be used to determine the attribute. Moreover, in some examples, neural networks such as residual networks may be used to determine the attribute of the item of interest. In some examples, the machine learning model may be trained based on user interaction with the item of interest. For example, the user may be prompted, for example, by the system such as WHUD 300, to interact with the item of interest so that the attributes of the item of interest may be learnt by the machine learning model, which may be implemented by the WHUD 300. The user interaction with the item of interest may be detected, and the attributes (such as visual attribute, audio attribute, or the like) of the item of interest may be determined (e.g., learnt) based on the user interaction.

In some examples, the attribute of the item of interest may be or may include a visual attribute which may be determined by obtaining image data associated with the plurality of images which may include the item of interest. The image data may be analyzed to extract the attribute of the item of interest. In some examples, the plurality of images is captured by using a camera of the WHUD 300. In some examples, each of the plurality of images may correspond to a different viewing perspective of the item of interest. The attribute of the item of interest may be determined based on image-based user-initiated item registration. For example, the user (e.g., a wearer of the WHUD 300) may provide multiple images of the item of interest, spanning various viewpoints for the attribute determination. In some examples, the images of the item of interest may be captured by the user by using the WHUD 300. The user may hold the item of interest in front of the camera of WHUD 300, and may rotate the item of interest while the WHUD 300 records a video or otherwise captures the attributes of the item of interest. In some examples, the attribute of the item of interest may be an audio attribute, which may be determined by obtaining audio data associated with an audio captured by the WHUD. The audio data may be analyzed to extract the attribute of the item of interest. The audio may be generated when the user interacts with the item of interest such that the item of interest produces distinct and recognizable audio signals. The hand engineered, or machine-learned features (audio attribute) for the item of interest may be extracted from the audio data, which is generated based on the user interaction with the item of interest. These features may be distinct enough so as to confirm the presence of the item of interest based on the audio data. In some examples, the audio attribute of the item of interest may be a Mel Frequency Cepstral Coefficient (MCC) hand engineered audio feature. For example, the item of interest may be a bunch of keys belonging to the user. The registration of the audio jingle of the user's keys may be initiated by the user. For example, the user may cause the keys to jingle (user interaction), and the WHUD 300 may record the jingle audio to register the jingle sound as the attribute of the user's keys. Additionally, or alternatively, the WHUD may learn the jingle of the user's keys over time using machine learning. Additionally, or alternatively, the WHUD may access a database of key jingles to determine characteristics or sound profiles that match key jingle sounds, and thus determine or register the attribute of the keys.

At block 110 the item of interest is detected by using a WHUD or based on the attribute data. Environmental data captured from an environment surrounding the WHUD is obtained from the WHUD, and the attribute data is compared with the environmental data to detect the item of interest. For example, based on the comparison of the attribute data and the environmental data, the item of interest may be detected in an environment (e.g., physical environment) surrounding the WHUD. In other words, the item of interest may be detected by detecting the attribute of the item of interest in data corresponding to the environment surrounding the WHUD. In some embodiments, the environmental data may include or may be live view (LV) image data. For example, a live view (LV) image of a live view in a line of sight of the camera of the WHUD may be captured using the camera of the WHUD, and the item of interest may be detected in the LV image. In some examples, the attribute data may be compared with the LV image data corresponding to the LV image to detect the item of interest in the LV image. The live view may be captured by the camera of the WHUD intermittently because continuously processing visual data from the camera for the item detection may be processing intensive and battery intensive. The continuous processing of the visual data may be reduced by relying on cues from other sensors of the WHUD to wake up the camera of the WHUD and perform image capturing and processing for item detection. To this end, the camera of the WHUD may be activated to capture the LV image after determining that the item of interest is present in the live view. For example, sensor data from a sensor of the WHUD, such as, but not limited to, the microphone of the WHUD may be obtained. The sensor data obtained from the sensor of the WHUD may be indicative of the presence of the item of interest in the live view. For example, the audio data obtained from the microphone of the WHUD may include attribute data of the item of interest, thus indicating the presence of the item of interest in the live view. After determining from the sensor data of the WHUD that the item of interest is present in the live view, the camera of the WHUD may be activated to capture images of the item of interest for determining the location of the item of interest.

In some examples, the environmental data may include or may be audio data which may correspond to audio captured using the microphone of the WHUD. The captured audio may correspond to the physical environment surrounding the WHUD. The attribute data (which may correspond to an audio feature associated with the item of interest) may be compared with the audio data to detect the item of interest. For example, if the attribute data matches with the audio data or if the attribute data is found in the audio data, a determination may be made that the item of interest is present in the live view in the line of sight of the camera of the WHUD. Further, IMU data associated with the detection of the item of interest is obtained and stored in association with the audio data. The IMU data may be further indicative of the location of the item of interest.

At block 115, in response to the detection of the item of interest, location data indicative of the item of interest may be obtained. The location data may correspond to the LV image which may include the item of interest. For example, the location data corresponding to the LV image may be obtained based on the detection of the item of interest in the LV image. The location data corresponding to the LV image may be designated as the location data indicative of the location of the item of interest. In some examples, the location of the item of interest may be determined by analyzing the LV image, and determining the position of the item of interest in the environment captured in the live view. In instances utilizing audio data, the location data corresponding to the captured audio may be obtained. The captured audio may be the audio based on which the item of interest is detected. The location data corresponding to a location associated with the audio (which confirms the presence of the item of interest) may be determined as the location data associated with the item of interest.

In some examples, a location of the WHUD may be determined, and the location of the item of interest may be determined relative to the location of the WHUD. For example, location data (WHUD location data) indicative of the location of the WHUD may be obtained to determine the location of the WHUD. In other words, the WHUD location data may be obtained to determine the location data indicative of the location of the item of interest. The location of the WHUD may be determined by using one or more of: a camera of the WHUD, a global positioning system, and an IMU of the WHUD. For example, a set of images captured by the camera of the WHUD may be analyzed to map a position of the WHUD in the environment, and thus determine the location of the WHUD. IMU data may be obtained from the IMU of the WHUD, and the location of the WHUD may be determined based on the analysis of the set of images and the IMU data. In some examples, the position of the WHUD in a map of the environment may be determined by using data from a GPS sensor, when available. As described previously, the location of the WHUD may also be determined by using sensors (such as the IMU unit) of the WHUD, in addition to or as an alternative to the GPS. In some examples, the determined location of the WHUD may be a position of the WHUD that may be as specific as a 6 degree of freedom position vector (e.g., three degrees for rotation and three degrees for translation). In some examples, the determined location of the WHUD may be as abstract as a room scale description of the scene (e.g., kitchen, gym, or the like). In some examples, the map of the environment surrounding the WHUD may be an abstract data structure that includes position cognizant data such as GPS data, image frames data, IMU data, or the like. The location of the WHUD also may be determined by using the camera of the WHUD. For example, the WHUD may have an "Always ON localization" mode that may use input from the camera of the WHUD as a primary input for the location determination. With the "Always ON Localization" mode, a set of relevant image frames may be tracked, and associated sensor data may be obtained. Furthermore, the computer vision may be used to infer the map and position of the WHUD. For example, simultaneous localization and mapping (SLAM) algorithms may be used to determine the position of the WHUD. One such example framework for real time localization includes ORB-SLAM framework.

In an effort to minimize the computations from processing images frequently, the "Always on Localization" may use a fusion of the IMU data and computer vision. In some examples, the IMU data may be sampled at a higher frequency for estimating the position of the WHUD while the computer vision use may be less frequent. The location (position) of the WHUD may be determined based on a "Sometimes ON Localization" mode that may include using triggers for localization of the WHUD. For example, a trigger may be detected for the location determination, and in response to detecting the trigger for the location determination, the location determination of the WHUD may be initiated. In some examples, the trigger may be based on data from the sensors (microphone, camera, IMU, or the like) of the WHUD, which may be indicative of the item of interest in the live view of the WHUD. For example, the sensor data may be indicative of an event (interaction event) such as the item of interest being the subject of an interaction by the user of the WHUD. Such an event may act as the trigger to activate the camera of the WHUD. When such interaction events occur, the camera of the WHUD may be activated, and the item of interest may be associated with a scene metadata. The scene metadata may include an important image frame, a scene label for the important image frame, and a location for the important image frame. An example framework for scene metadata creation may include a "Bag of Visual Words framework" which may be employed by the WHUD. In some examples, the item of interest may be associated with the scene metadata by using bounding box detection algorithms such as, but not limited to, a YOLO (You only look once) detector, and the like. The location of the item of interest may be tracked by the WHUD, and location data indicative of the location of the WHUD may be updated based on the change in the location of the item of interest. In some examples, the location of the item of interest may be tracked continually. In some examples, the location of the item of interest may be tracked by detecting the presence of the item of interest in proximity to the WHUD. Such detection may be based on inputs from various sensors of the WHUD.

At block 120, the location data (indicative of the location of the item of interest) in association with a context of detection of the item of interest may be stored. The context of detection may include an image frame captured by the WHUD that includes the item of interest. The image frame may correspond to the last sighting of the item of interest as detected by the WHUD. The context of detection also may include a time of detection. Thus, the location data may be stored in association with the time of detection, or image data corresponding to the image (image frame) indicative of the position of the item of interest relative to another item in the environment. A repository such as a knowledge graph may be generated, for example by the WHUD itself. The knowledge graph may include information (such as location information) about items of interest, which may be registered by the user of the WHUD. For example, each bounding box in the captured images may be processed to check for items that are registered by the user as the items of interest. If such an item is found, the location (position) of the item may be recorded/updated based upon the localization and other methods as described above. Alternatively, along with the item's location or position, the image frame or the time of detection indicative of the detection of the item of interest may also be recorded/updated in the knowledge graph. In some examples, the knowledge graph may be hosted on a cloud.

Turning now to block 125, a trigger is be detected. In some examples, the trigger may be or may include a user query corresponding to the item of interest. For example, the user query may be obtained by the WHUD through the microphone of the WHUD. The microphone of the WHUD may detect speech of the user querying about the location (position) of the item of interest. In some examples, the user query may be detected by detecting a gesture of the user. In some examples, the user query may be obtained by the WHUD via a user device (e.g., a mobile device, a tablet, a laptop, or the like) associated with the user.

Turning now to block 130, in response to the trigger, a location indication based on the location data may be output. In some examples, the location indication may be or may include information indicative of the location of the item of interest. The WHUD may display the location indication, e.g., the WHUD may display the location information corresponding to the item of interest. In some examples, the WHUD may generate and output audio indicative of the location of the item of interest. In some examples, the WHUD may also output the context of detection of the item of interest. In some examples, the WHUD may output navigation instructions for the user to reach to the location or position of the item of interest. In some examples, when the user query for the item of interest is obtained, the WHUD may search in the knowledge graph for the last sighting of that item and may either display the image frame (which includes the item of interest) to the user or may guide the user to the position of the item, such as by using metadata like location data stored in association with the last sighting of the item. The location indication may be output on the user device (e.g., a mobile device, a tablet, a laptop, or the like). In some examples, the WHUD may transmit location indication information to the user device. For example, the WHUD may send a notification or a message to the user device, which may include the location information of the item of interest. The notification or the message may also include navigating instructions to reach to the location of the item of interest from the current location of the user.

Figure 2:
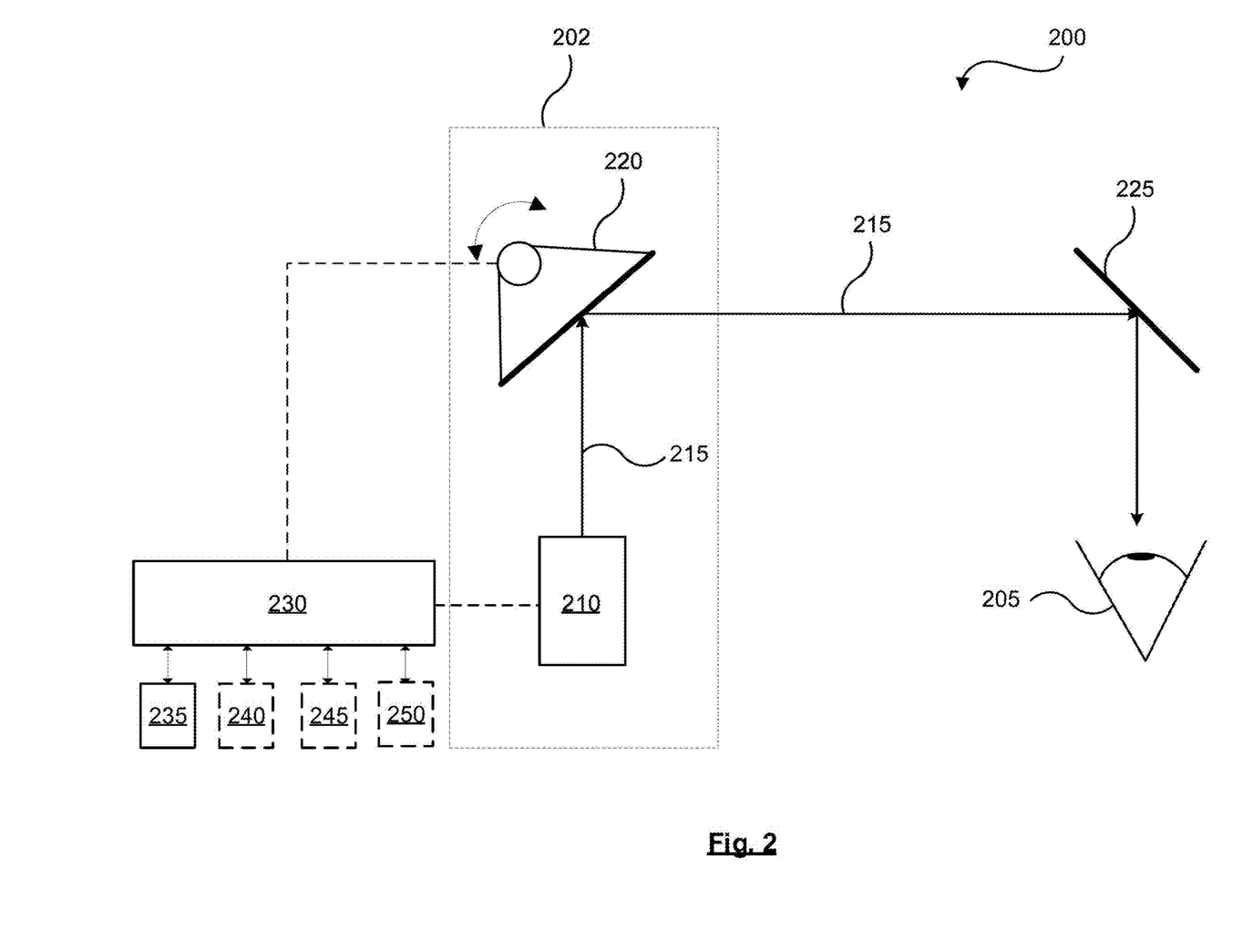
FIG. 2 shows a schematic representation of an example display system which may be used to perform the example method of FIG. 1 in accordance with some embodiments of the present disclosure.

Turning now to FIG. 2, a schematic representation is shown of an example system 200 which may be used to perform method 100 in accordance with some embodiments. System 200 operates to form or project an image viewable by an eye 205 of a viewer and thus may also be referred to or described as an image projection device, a display device, a display system, or a display. The viewer may also be described as a user of system 200. System 200 comprises a light engine 202 to generate a beam of output light 215. In some examples, light engine 202 comprises a light source 210 to generate output light 215. Light source 210 may comprise at least one laser, at least one light emitting diode, and the like. Light engine 202 also comprises a spatial modulator 220 to receive output light 215 from light source 210. In some examples, spatial modulator 220 may comprise a movable reflector, a micro-electro-mechanical system (MEMS), a digital micromirror device (DMD), and the like. In some examples, spatial modulator 220 may be part of a relay optic of system 200. While FIG. 2 shows light engine 202 as comprising spatial modulator 220, it will be appreciated that light engine 202 need not comprise spatial modulator 220 or light source 210. Further, light engine 202 may comprise a micro-display, or other light sources suitable for forming an image.

System 200 further comprises a display optic 225 to receive output light 215 from light engine 202 and direct the output light towards eye 205 of a viewer to form an image viewable by the viewer. Moreover, in some examples system 200 may be a part of or incorporated into a WHUD, such as the WHUD 300 of FIG. 3. Such a heads-up display may have different designs or form factors, such as the form factor of eyeglasses, as is described in greater detail in relation to FIG. 3. In examples where system 200 is in the form factor of glasses, display optic 225 may be on or in a lens of the glasses. In addition, system 200 comprises a controller 230 in communication with the light engine 202, a camera 235, a microphone 240, an IMU 245, and other sensor(s) 250. In FIG. 2, the microphone 240, the IMU 245, and the sensor 250 are shown in boxes with dashed lines to indicate that in some examples the system 200 need not comprise one or more of the microphones 240, the IMU 245, and the sensor 250. Controller 230 may control the light engine 202 to project an image (e.g., an image indicative of the location of the item of interest). Controller 230 may control and use the camera 235 to capture images of a scene in the line of sight of the camera, and to perform other operations as described in relation to methods such as method 100 described herein. Controller may also control the microphone 240, the IMU 245, and the other sensor 250 to perform operations as described in relation to methods such as method 100 described herein. Controller 230 may perform or control performance of other operations described in relation to method 100 and elsewhere in this description. In some examples, the image to be projected may be a still image, a moving image or video, an interactive image, a graphical user interface, and the like.

The controllers described herein, such as controller 230, may comprise at least one processor in communication with at least one non-transitory processor-readable medium, such as a memory, a hard disc drive, an optical disc drive, and the like. The processor-readable medium may have instructions stored thereon which when executed cause the processors to control the light source and the spatial modulator as described in relation to the methods and systems described herein. Moreover, in some examples the controllers may be free-standing components, while in other examples the controllers may comprise functional modules incorporated into other components of their respective systems. In some examples, some or all of the functionality of the controllers such as the controller 230 may be implemented by cloud-hosted components. Furthermore, in some examples the controllers or their functionality may be implemented in other ways, including: via Application Specific Integrated Circuits (ASICs), in standard integrated circuits, in programmable logic, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

Turning now to FIG. 3, a partial-cutaway perspective view of an example WHUD 300 is shown in accordance with some embodiments. WHUD 300 includes a support structure 305 that in use is worn on the head of a user and has the general form factor and appearance of an eyeglasses (e.g., sunglasses) frame. Eyeglasses or sunglasses may also be generically referred to as "glasses". Support structure 305 may carry components of a system to display information (e.g., location indication of the item of interest), such as system 200. Support structure 305 may also carry components such as a microphone, speaker, IMU unit, or the like. For example, the light source module may be received in a space 310 in a temple arm of support structure 305. In other examples, one or more of the image projection components or systems described herein may be received in or carried by support structure 305.

The spatial modulator of the systems described herein may be implemented in or be part of component 315 of support structure 305. The spatial modulator in turn may direct the output light onto a display optic 320 carried by a lens 325 of support structure 305. In some examples, display optic 320 may be similar in structure or function to display optic 225. Moreover, in some examples display optic 320 may comprise a light guide comprising an optical incoupler and an optical outcoupler. WHUD also includes a camera 330, which may be carried by support structure 305. While FIG. 3 shows the camera 330 to be present on a front side of the support structure to capture live views as seen by the wearer, it is contemplated that in some examples the camera 330 may also be present on another location on the support structure (such as in the temple arm of the support structure 305).

Figure 4:
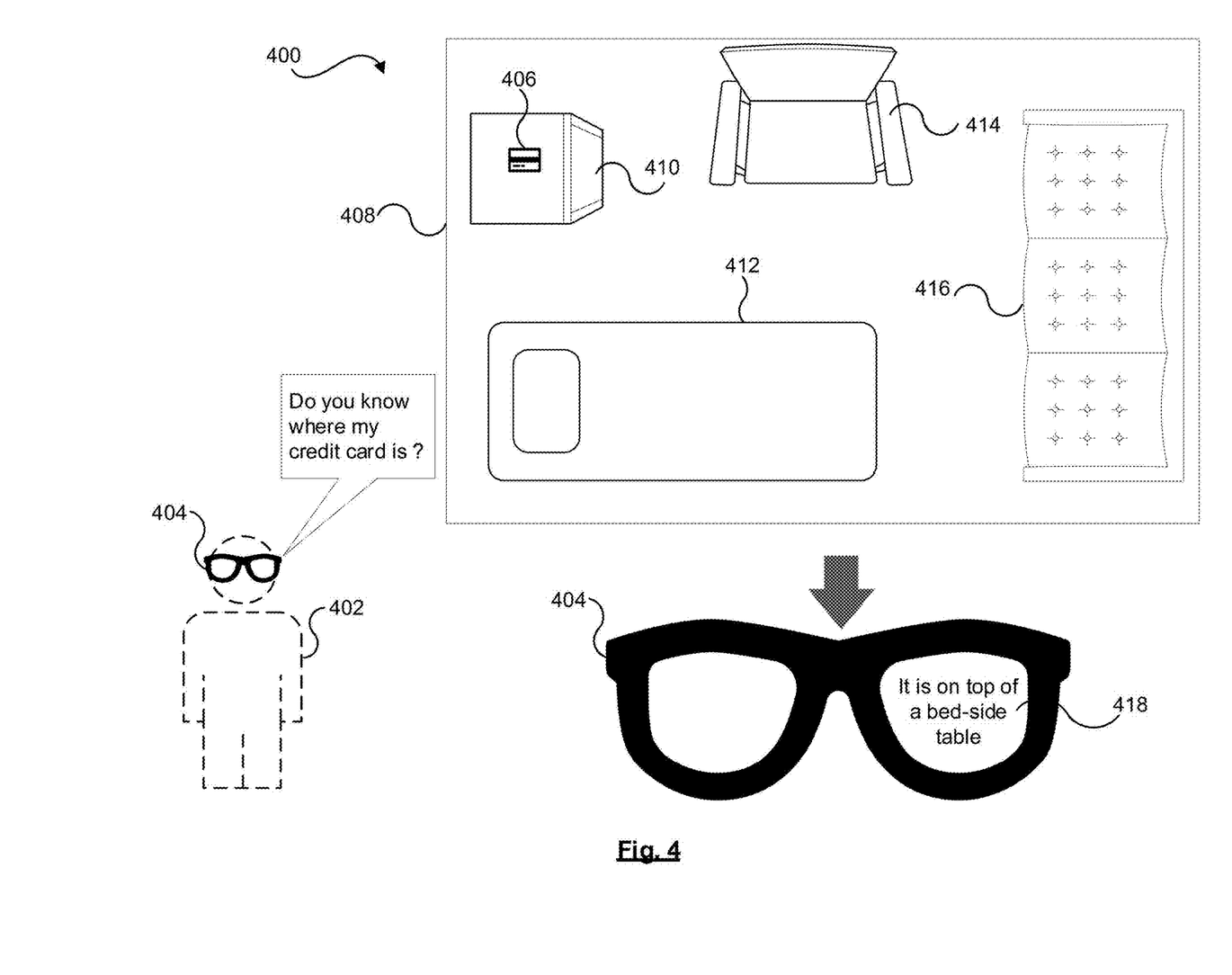
FIG. 4 shows an example operation of the method of FIG. 1 in accordance with some embodiments of the present disclosure.

Turning now to FIG. 4, an example operation 400 of method 100 is described. A user 402 wearing a WHUD 404 (e.g., one embodiment of WHUD 300 of FIG. 3) is in a room 408 (e.g., a hotel room). The user 402 misplaces a credit card 406 and inquires with the WHUD 404 about the credit card 406. The WHUD 404 may be similar to WHUD 300 (which implements methods disclosed herein). For example, the user 402 asks the WHUD "Do you know where my credit card is?" The WHUD 404 answers to the user's query by displaying a textual response that "It is on top of a bed-side table." The WHUD 404 displays the response 418 to the user query. Additionally, or alternatively, the WHUD 404 may also display an image of the credit card 406 as last sighted on top of the bed side table 410. In this example, the credit card is an item of interest, and the WHUD 404 may have registered a visual attribute of the credit card 406 as an attribute of the item of interest. For example, a name of the user or a credit card number printed on the credit card may be the visual attribute that may have been registered by the WHUD 404 as an attribute for the credit card 406. The registration of the attribute of the credit card 406 with the WHUD 404 may have been initiated by the user 402. For example, the user 402 may have captured several images of the credit card 406 using a camera of the WHUD 404. As described above in relation to method 100, the WHUD 404 may have analyzed the captured images to identify the visual attribute of the credit card 406. Additionally, or alternatively, the WHUD 404 may have learned (based on machine learning) the visual attribute of the credit card, for example, when the user 402 may have been interacting with (e.g., using) the credit card 406. Based on the user interaction, the WHUD 404 may have registered the credit card 406 as the item of interest, and the WHUD 404 may have stored the learned visual attribute as the attribute of the credit card 406.

In this example, the WHUD 404 may have been capturing images of the room 408 (for example, from time to time) while the user 402 was in the room 408. The WHUD 404 may analyze image data corresponding to the captured images to obtain environmental data corresponding to an environment (environment of the room) surrounding the WHUD 404. The environmental data may correspond to items such as credit card 406, bed-side table 410, bed 412, chair 414, and sofa 416 inside the room 408. Further, the WHUD 404 may compare attribute data corresponding to the attribute of the credit card 406 with the environmental data to detect the credit card 406. That is, the WHUD 404 may analyze the captured images to detect the credit card 406. In response to the detection of the credit card 406, the WHUD 404 may determine a location (e.g., a position) of the credit card 406. Further, the WHUD 404 may store location data indicative of the location of the credit card 406 in association with a context of detection of the credit card 406. For example, the WHUD 404 may have last detected the credit card 406 on top of the bedside table 410. The WHUD 404 may store such location or position information about the credit card 406. The WHUD 404 may also maintain a knowledge graph (as described above in relation to method 100) and may update the location information of the credit card 406 in the knowledge graph if the location/position of the credit card 406 changes. Additionally, the WHUD 404 may capture an image when the credit card 406 was on top of the bedside table 410 and may store the captured image as context of detection of the credit card 406 in the knowledge graph.

In response to the user query (that acts as a trigger), the WHUD 404 may output (e.g., displays) location information indicative of the location of the credit card 406, and thus may help the user 402 in locating the missing credit card 406. In this example, the room 408 may be a hotel room, which may be an unknown physical environment for the WHUD 404. This example demonstrates contextual awareness capability of the WHUD 404, e.g., the capability of the WHUD 404 to detect the item of interest in the unknown environment and to provide location indication of the item of interest to the user 402.

In another example (not depicted in the drawings), after working out on a treadmill in a gym, a user may forget to pick up car keys that were in a small compartment on the treadmill. The user may move to several machines throughout a workout and only realize about the misplaced keys as the user is about to exit the gym. The user can ask the user's WHUD (example WHUD 300 implementing the methods disclosed herein) if the WHUD knew about the car keys. The WHUD can respond by informing the user that the keys were left in the compartment on the treadmill, and the WHUD can display the last image of the keys as seen by a front facing camera of the WHUD, and optionally navigate the user towards the treadmill. Thus, the WHUD can save a user search time. In this example, the WHUD may use a jingle sound of the car keys as an attribute to detect the item of interest (car keys). The audio jingle of the car keys may have been registered by the WHUD as an attribute of the car keys. The registration process may have been user-initiated. For example, the user may have caused the keys to jingle while the WHUD was recording. Alternatively, the WHUD may have learnt the jingle of the car keys over time using machine learning. Alternatively, the WHUD may have accessed a database of key jingles to determine characteristics and sound profiles that typically match key jingle sounds. In the above examples, the WHUD may have relied on live view images (e.g., computer vision) captured by the WHUD to detect the car keys. It is contemplated that, in some examples, the WHUD may not rely on computer vision analysis of the keys, and may rely only on captured audio. In such examples, the WHUD may take a snapshot and/or store data like geolocation when the key jingle is detected. When the user asks, "where are my keys", or inputs a query using another input, a snapshot or geolocation of the keys may be presented to the user, which may be indicative of a position where the keys were last heard, or other location information or hints can be presented to the user. As described previously, any sensor input (e.g., from sensors of the WHUD) may be used to assist in tracking the location of the item of interest. For example, if an IMU unit of the WHUD determines that the user was travelling above 30 km/h when the keys were last identified, the WHUD may determine that data like geolocation may not be helpful, and that the keys may be in the user's car. This example demonstrates contextual awareness of the WHUD with an ability of recognizing and remembering items, and the ability to localize itself, its target (treadmill) and navigate the wearer to the target, for example without using GPS.

Methods and systems disclosed herein may be used for any item which has a discernible appearance or a discernible sound profile, such as, but not limited to, wallets, mobile devices such as cell phones, cards like ID cards, credit cards, keys, or the like. It is contemplated that method 100 described herein may be performed by system 200, WHUD 300, and the other systems and devices described herein. It is also contemplated that methods 100 and the other methods described herein may be performed by systems or devices other than the systems and devices described herein. In addition, it is contemplated that system 200, and WHUD 300 and the other systems and devices described herein may have the features and perform the functions described herein in relation to method 100 described herein. Moreover, system 200 and WHUD 300, and the other systems and devices described herein may have features and perform functions other than those described herein in relation to method 100, and the other methods described herein. In addition, while some of the examples provided herein are described in the context of augmented reality devices and WHUDs, it is contemplated that the functions and methods described herein may be implemented in or by display systems or devices which may not be WHUDs.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims but should be construed to include all possible implementations along with the full scope of equivalents to which such claims are entitled. Accordingly, the claims are not limited by the disclosure.

What is claimed is:

1. A method comprising:
    obtaining attribute data corresponding to an attribute of an item of interest;
    detecting, using a wearable heads-up display (WHUD), the item of interest based on the attribute data and by:
        obtaining environmental data captured by the WHUD for an environment surrounding the WHUD; and
        responsive to the environmental data including the attribute data, determining the item of interest has been detected;
    obtaining, in response to the detection, location data indicative of a location of the item of interest;
    storing the location data in association with a context of detection of the item of interest; and
    in response to a user-generated query associated with a location of the item of interest, outputting a location indication for the item of interest based on the location data.

2. The method of claim 1, wherein obtaining the attribute of the item of interest comprises:
    employing machine learning to determine the attribute of the item of interest by training a machine learning model with the attribute of the item of interest over a period of time and storing the attribute in association with the item of interest.

3. The method of claim 2, wherein training the machine learning model comprises training the machine learning model based on user interaction with the item of interest.

4. The method of claim 1, wherein determining the attribute of the item of interest comprises:
    obtaining image data associated with a plurality of images, the plurality of images comprising the item of interest and captured by at least one camera of the WHUD; and
    analyzing the image data to extract the attribute of the item of interest.

5. The method of claim 1, wherein obtaining the attribute of the item of interest comprises:
    obtaining audio data associated with an audio captured by the WHUD; and
    analyzing the audio data to extract the attribute of the item of interest.

6. The method of claim 1, wherein obtaining the environmental data comprises:
    capturing, using a camera of the WHUD, a live view (LV) image of a live view in a line of sight of the camera of the WHUD; and
    wherein comparing the attribute data comprises:
        comparing the attribute data with LV image data corresponding to the LV image to detect the item of interest in the LV image.

7. The method of claim 6, further comprising:
    obtaining sensor data from a sensor of the WHUD;
    determining from the sensor data that the item of interest is present in the live view; and
    activating, based on the determining, the camera of the WHUD to capture the LV image.

8. The method of claim 1, wherein obtaining the environmental data comprises:
    capturing, using a microphone of the WHUD, audio data of the environment surrounding the WHUD; and
    wherein comparing the attribute data comprises:
        comparing the attribute data with the audio data to detect the item of interest.

9. The method of claim 8, further comprising:
    obtaining inertial measurement unit (IMU) data associated with detection of the item of interest; and
    storing the IMU data in association with the audio data, wherein the IMU data is further indicative of the location of the item of interest.

10. The method of claim 1, wherein obtaining the location data comprises:
    obtaining WHUD location data indicative of the location of the WHUD; and
    determining the location of the item of interest relative to the location of the WHUD.

11. The method of claim 10, wherein:
    obtaining the WHUD location data comprises determining the location of the WHUD by using one or more of:

a camera of the WHUD, a global positioning system, and an inertial measurement unit (IMU) of the WHUD; and determining the location of the WHUD by using the camera of the WHUD comprises analyzing a set of images captured by the camera of the WHUD to map a position of the WHUD in the environment.

12. The method of claim 1, wherein obtaining the location data comprises tracking the location of the item of interest by the WHUD and storing the location data comprises updating the location data based on a change in the location of the item of interest.

13. The method of claim 1, wherein storing the location data comprises:

storing the location data in association with at least one of a time of detection or image data corresponding to an image indicative of a position of the item of interest relative to another item in the environment.

14. The method of claim 1, wherein outputting the location indication comprises:

outputting, by the WHUD, information indicative of the location of the item of interest.

15. The method of claim 14, wherein the information indicative of the location of the item of interest comprises at least one of: a displayed description of the location; and at least one displayed image of the item of interest at the location.

16. A wearable heads-up display (WHUD) comprising:

a camera to capture scenes in a line of sight of a user wearing the WHUD;

a light engine to generate a display light;

a display optic to receive the display light from the light engine and to direct the display light towards an eye of the user of the WHUD to form an image viewable by the user; and a controller in communication with the camera and the light engine, the controller to:

obtain attribute data corresponding to an attribute of an item of interest;

detect the item of interest based on the attribute data by obtaining environmental data captured by the WHUD for an environment surrounding the WHUD; and responsive to the environmental data including the attribute data, determining the item of interest has been detected;

obtain, in response detecting the item of interest, location data indicative of a location of the item of interest;

store the location data in association with a context of detection of the item of interest, wherein the context of detection includes an image indicative of a position of the item of interest relative to another item in the environment; and in response to a user-generated query associated with a location of the item of interest, output a location indication for the item of interest based on the location data.

17. The WHUD of claim 16, wherein the controller is to obtain the attribute of the item of interest by employing machine learning to determine the attribute of the item of interest by training a machine learning model with the attribute of the item of interest over a period of time and storing the attribute in association with the item of interest.

18. The WHUD of claim 16, wherein the controller is to determine the attribute of the item of interest by obtaining image data associated with a plurality of images, the plurality of images comprising the item of interest and captured by at least one camera of the WHUD and analyzing the image data to extract the attribute of the item of interest.

19. The WHUD of claim 16, wherein the controller is to obtain the attribute of the item of interest by obtaining audio data associated with an audio captured by the WHUD and analyzing the audio data to extract the attribute of the item of interest.

20. A method comprising:

obtaining attribute data corresponding to an attribute of an item of interest;

detecting, using a wearable heads-up display (WHUD), the item of interest based on the attribute data and by:

obtaining environmental data captured by the WHUD for an environment surrounding the WHUD; and responsive to the environmental data including the attribute data, determining the item of interest has been detected;

obtaining, in response to the detection, location data indicative of a location of the item of interest;

storing the location data in association with a context of detection of the item of interest, wherein the context of detection includes at least one of a time of detecting of the item of interest or an image indicative of a position of the item of interest relative to another item in the environment;

in response to a user-generated query associated with a location of the item of interest, outputting a location indication for the item of interest based on the location data; and responsive to outputting the location indication, further outputting at least one of the time of detecting of the item or the image indicative of a position of the item of interest relative to the other item in the environment.

* * * * *